United States Patent [19]

Kuenzly et al.

[11] 4,288,982

[45] Sep. 15, 1981

[54] LOW THRUST MONOPROPELLANT ENGINE

[76] Inventors: John D. Kuenzly, Redondo Beach, Calif.; Robert A. Frosch, Administrator of the National Aeronautics and Space Administration, with respect to an invention of John D. Kuenzly

[21] Appl. No.: 971,474

[22] Filed: Dec. 20, 1978

Related U.S. Application Data

[63] Continuation of Ser. No. 819,029, Jul. 25, 1977, abandoned.

[51] Int. Cl.³ .............................................. F02K 9/44
[52] U.S. Cl. ............................... 60/200 R; 60/39.46 M
[58] Field of Search ............. 60/39.46 M, 200 R, 203, 60/258, 218; 239/491; 75/172, 176; 219/301

[56] References Cited

U.S. PATENT DOCUMENTS

| | | | |
|---|---|---|---|
| 981,481 | 1/1911 | Shoenberg | 219/301 |
| 2,378,348 | 6/1945 | Wilmes et al. | 239/491 |
| 3,054,252 | 9/1962 | Beckett et al. | 219/301 |
| 3,236,699 | 2/1966 | Pugh et al. | 75/176 |
| 3,312,539 | 4/1967 | Marshall et al. | 75/176 |
| 3,361,599 | 1/1968 | Barganier | 75/176 |
| 3,375,109 | 3/1968 | Peters | 75/176 |
| 3,696,616 | 10/1972 | Lucas | 60/218 |

FOREIGN PATENT DOCUMENTS 629809  9/1949  United Kingdom ............... 239/491

OTHER PUBLICATIONS

"Monopropellant Hydrazine Resistojet", TRW Report 20266-6024-RO-00; Mar., 1973.

*Primary Examiner*—Robert E. Garrett
*Attorney, Agent, or Firm*—Ronald F. Sandler; John R. Manning; John O. Tresansky

[57] ABSTRACT

A low thrust monopropellant engine having a conventional body and nozzle configuration wherein the monopropellant fuel is fed into the thruster with dual injection tubes via an injector shell with dual spray jets formed therein. The spray jets are positioned generally opposed to each other. A heater-screen pack combination thermally decomposes the fuel after injection into the combustion chamber of the thruster.

10 Claims, 3 Drawing Figures

LOW THRUST MONOPROPELLANT ENGINE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

This is a continuation, of application Ser. No. 819,029, filed July 25, 1977 and now abandoned.

BACKGROUND OF THE INVENTION

The invention relates generally to low thrust rocket engines. More particularly, the invention relates to low power thruster for extremely low temperature applications.

Low thrust monopropellant engines have been employed for many years to satisfy attitude and velocity control requirements for satellites. The conventional thruster employes a catalytic bed to ignite the propellant. The use of a catalytic bed in the thruster requires the almost exclusive use of hydrazine as a propellant. Hydrazine ($N_2H_4$) contains no carbon atoms and consequently will not degrade the catalyst bed which may be, for example, Shell 405. The use of hydrazine, however, may cause problems with the propellant supply system because of its high freezing point which raises the danger of the thruster propellant freezing when the satellite is in outer space. An attempt to substitute low freezing point propellants with otherwise similar characteristics to hydrazine has been made with the catalyst bed thrusters but such propellants have degraded the catalyst bed because they are universally carbonaceous and combustion has resulted in carbon deposits on the catalyst bed. This action substantially lowers the useful life of the thruster.

OBJECTS OF THE INVENTION

Accordingly, it is an object of the present invention to provide a low-level monopropellant thruster employing low freezing point propellants.

Another object of the invention is to provide a low-level monopropellant thruster with thermal decomposition of the propellants employed.

A further object of the instant invention is to provide a low-level monopropellant thruster without a catalyst bed.

Yet another object of the present invention is to provide a low-level monopropellant thruster which employs low freezing point propellants while retaining a long useful life.

SUMMARY OF THE INVENTION

According to the present invention the foregoing objects are attained by a low-level thruster employing dual injector tubes for carrying a monopropellant which tubes are connected to an injector shell shaped to form spray jets for atomizing the propellant.

DETAILED DESCRIPTION OF THE PREFERRED EMBODIMENT

Figure 1:
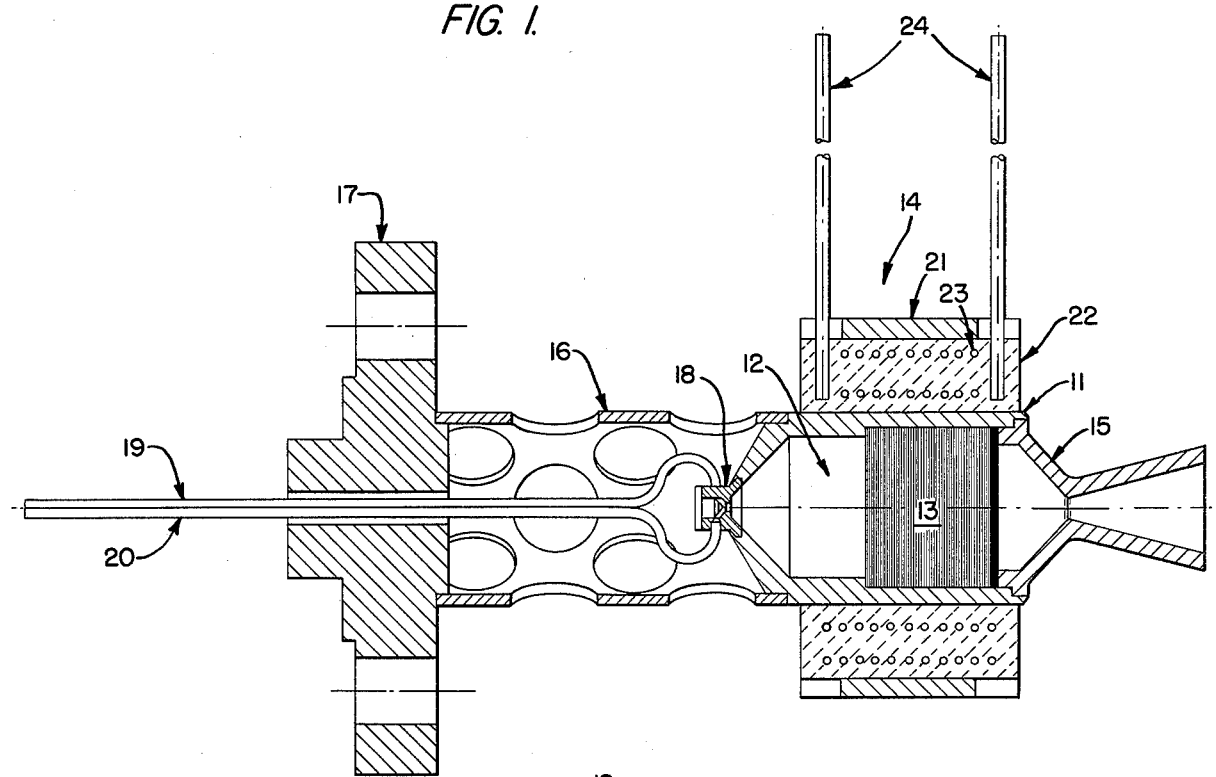
FIG. 1 is a cross-sectional view taken along the major axis of the thruster.

Referring to the drawing wherein reference numerals identify like parts throughout the several views, FIG. 1 depicts a thruster body which may be mounted on a thruster valve and fed a propellant by a pressurized diaphram or bladder. If, in turn, the thruster is contained in a spinning satellite, it may be gravity fed. Both of these operations may be accomplished in a conventional fashion.

A thruster body 11 is formed of a Mo-50% Re alloy and defines a combustion chamber 12. The thruster body surrounds and is attached to a platinum screen pack 13, which, in turn, is attached to and surrounded by a heater 14. A nozzle 15 also formed of Mo-50% Re, is welded to the rear end of thruster body 11. A barrier tube 16, constructed of Haynes alloy 25, is disposed intermediate of a seal plate 17, constructed of 304 series stainless steel, and the frontal area of thruster body 11. The barrier tube and the seal plate function to offset the thruster body 11 from, typically, a thruster valve (not shown). An injector shell 18 is secured to the front end of thruster body 11 by brazing and functions to atomize the propellant before it enters the head space of the thruster chamber 12. Dual injector tubes 19, 20, composed of Mo-50% Re or pure rhenium, run along the longitudinal axis of seal plate 17 and barrier tube 16 and serve as lines for propellant. The ends of these tubes are attached in a generally opposed fashion to the injector shell 18.

It is to be understood that screen pack 13 materials, packing density and characteristic length play a secondary—but very important—role with respect to propellant dispersal. More specifically, short screen packs greatly benefit pulse-mode operation but hamper steady-state operation. High packing densities allow the use of shorter screen packs, but increase residence times which, in turn, affect response time. Increased residence times promote endothermic, metal-catalyzed reactions. As a result, a rather standard packing density of 118 screens/cm is employed.

It has been found that screen pack materials which are catalytically active for carbonaceous, low freezing point propellants are rapidly degraded in a decomposing hydrazine type propellant environment. Typical of these materials are stainless steels, Inconels and Haynes-25. The preferred material for the screen pack 13 is platinum. The best results are obtained when not more than one-half of the screen pack area is impinged on by the atomized propellant spray.

The thermo-electric heater 14 provides heat to the screen pack 13 which, in turn, provides for the thermal decomposition of the propellant as an alternative to decomposition provided by a catalyst bed. The disclosed heater has a virtually unlimited life. The heater is annular and fabricated completely from refractory metals and oxides. A heater retainer tube 21, composed of Mo-50% Re, encloses an electrical insulator 22 which is composed of high purity alpha-alumina fabricated from alpha-alumina powder sintered at 2200° K. A heater wire 23, made of W-3% Re, is embedded in the insulator 22. Electrical power is applied to the heater wire 23 by lead wires 24 which are formed of rhenium and attached by a Mo-Ru braze. The heater 14 is also affixed to the thruster body 11 by brazing. The thermal capabilities of the disclosed heater configuration are about 1000° K. higher than prior art heaters commonly used.

Figure 2:
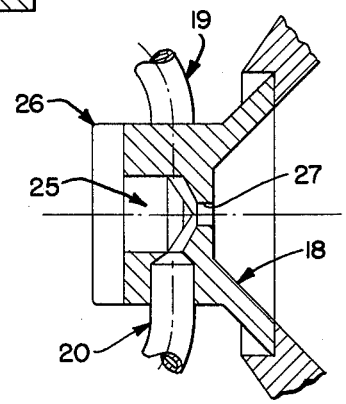
FIG. 2 is a cross-sectional view of the atomizing spray injector configuration of the thruster taken along its major axis.

FIG. 2 shows more clearly the injector tubes 19, 20 entering the injector shell 18. The front end of shell 18 has an injection area 25 into which propellant is fed by the injector tubes. The front end of the injection area is sealed by an injector plug 26 while the rear end of the injection area 25 is open to the thruster chamber 12 via aperture 27.

Figure 3:
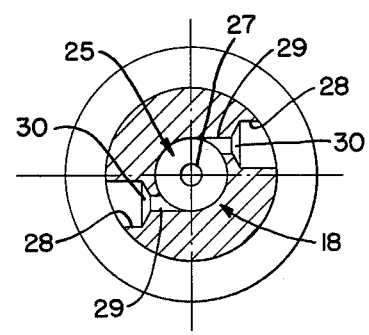
FIG. 3 is a front view of the injector shell of the thruster taken through the center lines of the injector tube recesses.

FIG. 3 shows more clearly the two recesses 28 formed in shell 18 for receiving injector tubes 19, 20. The center lines of the recesses may be generally parallel to a line going through the major axis of the shell 18 in a perpendicular fashion and offset therefrom. Connection lines 29 are formed in shell 18 from the recesses 28 in an essentially tangential fashion into the injection area 25. Aperture 27 is centrally located with respect to the injection area 25. The tip regions of the recesses 28 form the spray jets 30. It is important that the spray jets are generally opposed to each other.

It should be noted that the off-set spray jet configuration of this invention may be employed with catalyst bed thrusters as well as with thermal decomposition thrusters. Single stream injection has been found to cause severe bed channeling and ultimate flooding with a low thermal mass screen pack. Longer screen pack assemblies have allowed sustained operation but at the cost of holding power and pulsed-mode performance. An injector therefore is required which would (1) provide necessary pressure drop to limit the instantaneous flow rate immediately after valve opening, (2) decouple the propellant supply system from chamber pressure oscillations, (3) provide a small dribble volume, and (4) prevent two phase flow conditions which may result in propellant decomposition in the injector. In effect, single tube injectors could not produce a thruster using carbonaceous, low freezing point propellants capable of meeting auxiliary propulsion requirements regardless of changes in head space and screen pack configuration. Satisfactory operation could only be obtained for steady-state operation, not pulse-mode operation. Various prior art methods of fuel injection such as multiple injectors, drilled hemisphere "shower heads", concentric cylinders, swirler tubes and tangential injection misters, are unable to satisfy the required performance characteristics.

While specific materials are identified for the disclosed embodiment, other materials may be useful. The embodiment disclosed avoids the use of the previously used Haynes-25 alloy except for the barrier tube 16 where the material is not critical. The criteria for the successful application of a given material for thruster use is (1) must not nitride, (2) must allow easy fabrication, (3) must exhibit low catalytic activity with the propellant employed, both prior to and after combustion, and, (4) must be easily joined. Three materials successfully meet these criteria; namely, platinum—10% iriduim (Pt-10%Ir); zirconia grain stabilized platinum (ZGS-Pt); and, molybdenum—50% rhenium (Mo-50% Re).

The disclosed embodiment successfully allowed the use of low freezing point, carbonaceous propellants without requiring a catalyst bed which would be subject to degradation. Exemplary propellants which may be used in the thruster according to this invention include (1) monomethyl-hydrazine (MMH), (2) 50% MMH, 35% hydrazine ($N_2H_4$), 15% ammonia ($NH_3$), (3) 50% MMH, 50% $N_2H_4$, (4) 80% $N_2H_3$, 20% $NH_4$, (5) Aerozine—50 (50% $N_2H_4$-50% unsynmetrical dimethylhydrazine (UDMH)) and, (6) 23% hydrazine azide-77% $N_2H_4$ (designated as HA). All of these fuels exhibit freezing points well below the freezing point of hydrazine of 274.5° K. and, therefore, eliminate the inherent restrictions placed on spacecraft when using hydrazine and avoid complications related to spacecraft thermal control systems.

Low power level thrusters typically exhibit 0.1 to 0.2 pounds of thrust. The disclosed embodiment may well be useful on thrusters exhibiting thrust in the order of magnitude of 10 pounds. Physically, a typical low level thruster may be about ⅜" in diameter and two inches long. Injector tubes may have a five to six mil I.D. and a 14 mil O.D. For a thruster in the 0.1 to 0.2 pound range an injection area diameter of 0.0240" and an aperture diameter of 0.0075" have proved satisfactory. Spray jet regions may be offset from the center of the shell by about 0.0090".

The disclosed injection technique and composite heater-screen pack combination allow production of a low level thruster which may use low freezing point, carbonaceous propellants and yet have a potentially unlimited life. Such thrusters are viable alternatives to an entire generation of catalytic hydrazine thrusters. Several cautions must, however, be observed. In particular, joining and fabrication must be performed with the complete absence of any material containing silicon, phosphorous or titanium. Even trace quantities of these elements migrate to noble metal grain boundaries and cause severe embrittlement. Also, the introduction of air with $CO_2$ in seemingly insignificant quantities during propellant handling attacks the propellant system lines and causes the generation of high metallic ion concentrations which may clog the small diameter injector tubes.

The principles, preferred embodiment, and modes of operation of the present invention have been described hereinbefore. The invention which is intended to be protected herein, however, is not to be construed as limited to the particular forms disclosed since these are to be regarded as illustrative rather than restrictive. It is to be understood that variations may be made by those skilled in the art without departing from the spirit of the present invention.

What is claimed is:

1. A thruster for orienting spacecraft, comprising:
   a thruster body;
   a screen pack surrounded by and connected to said thruster body; and
   means for injecting a propellant into said thruster body, including:
   a plurality of injector tubes discrete from the thruster body; and
   an injector shall having an infundibuliform cavity with a discharge aperture, receptive means for connecting said injector tubes to said shell and a plurality of opposed limitation means disposed to atomize and tangentially discharge a propellant directly into the cavity.

2. The thruster of claim 1 wherein said injector tubes and said injector shell are formed of molybdenum rhenium.

3. The thruster of claim 1 wherein said receptive means include dual recesses formed in said injector shell.

4. The thruster of claim 3 wherein said dual recesses are formed generally parallel and opposed to each other.

5. The thruster of claim 1 wherein said thruster body is formed of molybdenum-50 percent rhenium.

6. A thruster for maneuvering satellites in space, comprising:
   a thruster body;
   a screen pack formed of platinum and surrounded by and connected to said thruster body;
   a heater surrounding and connected to said thruster body, including:
   a heater retainer tube surrounding said thruster body forming a space therebetween,
   a electrical insulator surrounding said thruster body within said space, and
   a heater wire encapsulated within said electrical insulator surrounding said thruster body; and
   means for injecting a propellant into said thruster body, said injection means including:
   dual injector tubes discrete from the thruster body, for conducting said propellant parallel to an axis and through single arcs to diametrically opposed terminals offset from the axis; and
   an injector shell having a pair of substantially parallel and opposed recesses therein for individually receiving different ones of said opposed terminals, an infundibuliform right circular cavity formed within said shell coaxial to the axis and in communication with said recesses via a pair of generally opposed spray jets for atomizing said propellant, said spray jets formed by tip regions of the recesses disposed to discharge tangentially into the circular cavity, and an aperture centrally located at an apex of the cavity between said spray jets, the aperture coupling said cavity with the interior of said thruster body.

7. A low power thruster, comprising:
   a combustion chamber;
   structural means adjoining the chamber, and providing an interior cavity having an interior perimeter and a centrally located aperture opening into the chamber;
   a plurality of recesses supplying said cavity, oriented tangentially to said interior perimeter;
   an equal plurality of atomizing means formed in general opposition by said recesses and adjoining the cavity;
   an equal plurality of conduit means distinct of said structural means, communicating directly into said atomizing means; and
   catalytic means for causing decomposition of a propellant inside said chamber.

8. A low power thruster, comprising:
   a combustion chamber;
   an injector shell with an interior cavity positioned adjoining said chamber and having centrally located perpendicular to its longitudinal axis an interior perimeter describing the base of a concial portion of the cavity with an aperture at its apex opening into said chamber;
   a plurality of injector shell recesses oriented tangentially to said interior perimeter and off-set from the longitudinal axis;
   an equal plurality of atomizing means formed by tip regions of said recesses and arranged to discharge into said cavity tangentially to the interior perimeter;
   an equal plurality of injector tubes discrete from the injector shell and leading directly into the recesses; and
   means for decomposing a propellant inside the chamber.

9. The thruster set forth in claims 7 or 8 wherein said means for decomposing the propellant comprises screen pack consisting essentially of platinum and having a surface area exposed to said aperture.

10. The thruster set forth in claim 9 wherein the propellant passing through the aperture impinges upon approximately one-half of said screen pack surface area.

* * * * *